Figure 2:
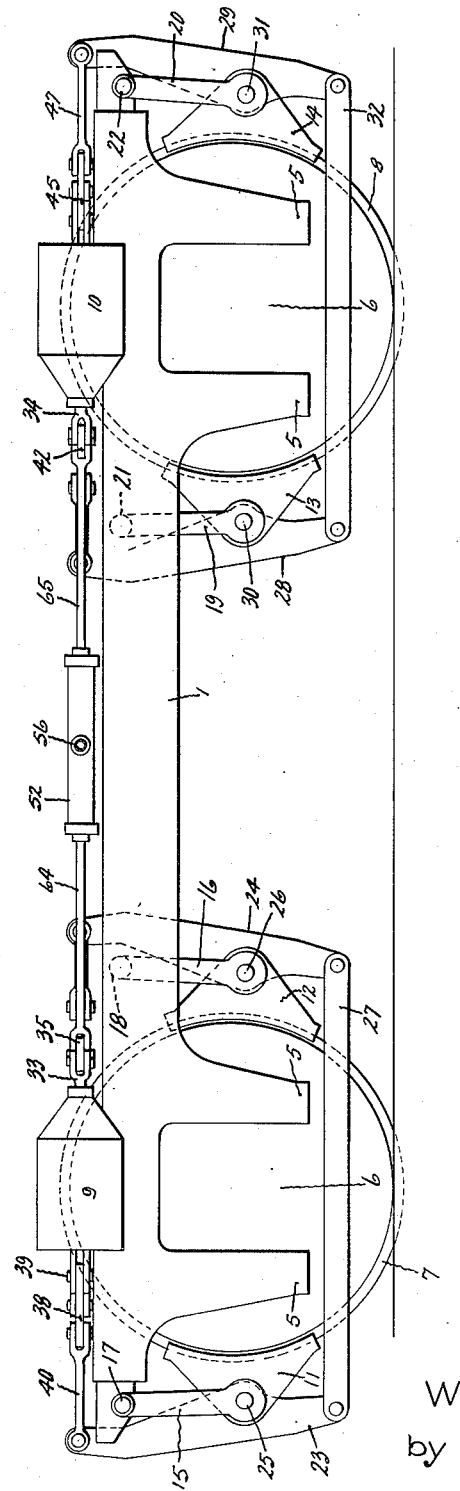

Aug. 12, 1952   W. R. SCHETTLER   2,606,632
BRAKE RIGGING
Filed March 1, 1950   2 SHEETS—SHEET 1
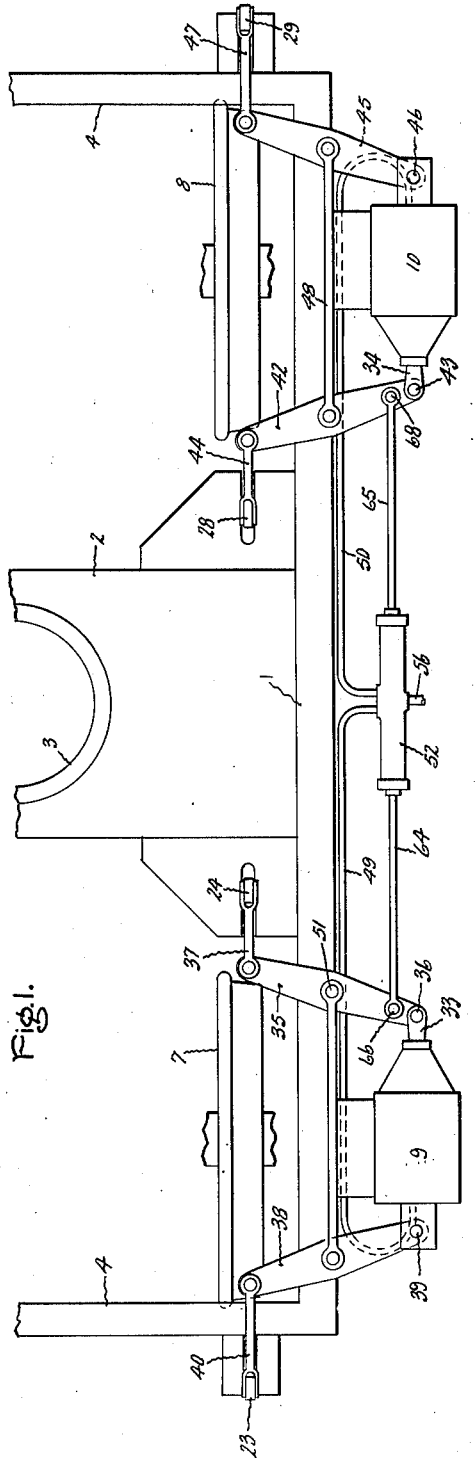
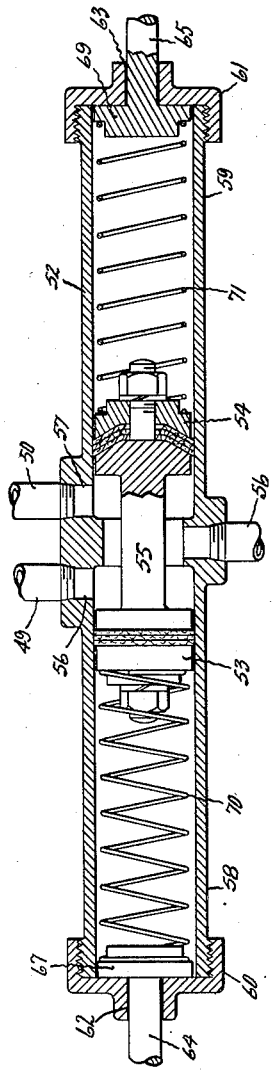
Inventor:
William R. Schettler,
by Ernest H. Britton
His Attorney.

Aug. 12, 1952 W. R. SCHETTLER 2,606,632
BRAKE RIGGING

Filed March 1, 1950 2 SHEETS—SHEET 2

Inventor:
William R. Schetter,
by Ernest H. Britton
His Attorney.

Patented Aug. 12, 1952

2,606,632

UNITED STATES PATENT OFFICE 2,606,632

BRAKE RIGGING

William R. Schettler, Erie, Pa., assignor to General Electric Company, a corporation of New York Application March 1, 1950, Serial No. 147,056

4 Claims. (Cl. 188—153)

This invention relates to brake riggings for rail vehicle trucks and, more particularly, to brake riggings of the type utilizing two air cylinders for independently applying two sets of clasp brakes.

In brake riggings used in connection with brakes of the clasp type in which two cylinders are utilized to independently apply two sets of brakes, it is desirable in order to quickly provide maximum braking effort that the brakes separately actuated by each cylinder be evenly applied. Furthermore, in certain types of brake rigging in which two air cylinders are used to apply the brakes on three wheels, undesirable cocking of the various brake levers will take place unless simultaneous and equal action of the two brake cylinders is secured.

An object of this invention is to provide an improved brake rigging utilizing two air cylinders wherein the brakes independently actuated by the two cylinders are evenly applied.

Another object of this invention is the provision of means for securing the equal movement of the operating rods of two air cylinders so that the brakes respectively actuated thereby may be evenly applied.

Further objects and advantages of this invention will become apparent and the invention will be better understood from the following description referring to the accompanying drawing, and the features of novelty which characterize this invention will be pointed out with particularity in the claims annexed to and forming a part of this specification.

In accordance with this invention, there is provided a brake rigging for a rail vehicle truck having two air cylinders for independently applying two sets of wheel brakes. Means are provided for actuating each of the brake sets including an operating rod on each of the cylinders and linkage connecting each operating rod and its associating brake set. An air line supplies air to each of the cylinders and a valve is associated with each of the air lines to respectively control the flow of air to the cylinders. Means are provided to hold the valves opened when the movement of the operating rods is equal and to close one valve when the movement is unequal so as to reduce the flow of air to the cylinder associated with that valve so that the movement of the operating rods is equalized, thus securing even application of the brake sets.

In the drawing, Fig. 1 is a partial vertical view of a two wheel truck provided with the improved brake rigging of this invention; Fig. 2 is a side elevational view of the truck of Fig. 1; and Fig. 3 is a cross sectional view of the improved stroke equalizing valve utilized in this invention.

Referring now to Figs. 1 and 2, there is shown a two wheel truck construction, of more or less conventional form, having side frames 1 and a center transom 2 provided with a center bearing 3. The side frames 1, only one of which is shown in Fig. 1, are connected by end transoms 4 and are provided with pedestals 5 forming journal openings 6 therebetween in the conventional manner. Journal boxes (not shown) are arranged in the journal opening 6 and respectively support the axles of wheels 7 and 8.

The brake rigging includes two air cylinders 9 and 10, mounted on the side frame 1, which respectively apply brake shoes 11 and 12 associated with wheel 7, and 13 and 14 associated with wheel 8. It is understood, of course, that an identical arrangement is provided on the other side of the truck. The brake shoes 11 and 12 are respectively supported by brake hangers 15 and 16 which are pivotally connected to the truck frame at 17 and 18. In a like manner, the brake shoes 13 and 14 are supported by brake hangers 19 and 20 pivoted on the truck frame at 21 and 22. Brake levers 23 and 24 are respectively secured to the brake shoes 11 and 12 by pivotal connections 25 and 26 and the lower ends of these levers are connected by connection rods 27. In a like manner, brake levers 28 and 29 are secured to the brake shoes 13 and 14 by pivotal connections at 30 and 31 and their lower ends are connected by connection rods 32. The brake operating cylinders 9 and 10 are respectively provided with operating or push rods 33 and 34. Operating rod 33 in connected to an equalizer 35 by a pivotal connection at 36 and the equalizer 35 is, in turn, connected to the brake lever 24 by a clevis 37. An equalizer 38 is provided having a fixed pivot at 39 and a connection with the brake lever 23 by a clevis 40. Equalizers 35 and 38 are connected by a pull rod 41. Likewise, the operating rod 34 of brake operating cylinder 10 is connected to equalizer 42 by a pivotal connection at 43 and the equalizer 42 is connected to the brake lever 28 by a clevis 44. Equalizer 45 has a fixed pivot at 46 and is connected to the brake lever 29 by a clevis 47. The equalizers 42 and 45 are connected by pull rod 48. The brake operating cylinders 9 and 10 are supplied with high pressure air through air lines 49 and 50.

In operation, referring to the brake rigging associated with wheel 7 as an example, the functioning of the brake rigging associated with wheel 8 being identical, the application of air to the cylinder 9 causes the operating rod 33 to move outward to the right causing equalizer 35 to pivot around its pivotal connection 51 with the pull rod 41. This causes the other end of the equalizer 35 to move toward the left pulling clevis 37 and the upper end of brake lever 24 toward the left to initially apply the brake shoe 12. As soon as the brake shoe 12 begins to frictionally engage the wheel 7, continued movement of the operating rod 33 to the right causes clevis 37 and the upper end of brake lever 24 to continue to move to the left, causing brake lever 24 to pivot at its connection 26 with the brake shoe 12 pulling connection rod 27 to the right which, in turn, brings about the application of the brake shoe 11. Further movement of the operating rod 33 to the right results in the clasping action of both brake shoes.

It will be readily apparent that in order to obtain the maximum braking effort in the shortest period of time, the brakes 11 and 12 associated with the wheel 7 and the brakes 13 and 14 associated with wheel 8 should be evenly and simultaneously applied. In order to secure this result, the arrangement now to be described is provided. Referring to Fig. 3 in addition to Figs. 1 and 2, there is shown a stroke equalizing valve assembly comprising hollow valve body member 52 having a pair of pistons 53 and 54 arranged therein. The pistons 53 and 54 are spaced apart and connected by a mechanical connection as at 55. The air lines 49 and 50 of the brake cylinders 9 and 10 communicate with the interior of the valve body 52 through ports 56 and 57. High pressure air for operating the brake cylinders is introduced to the valve body 52 from an external source (not shown) by an air line 56. The two outer ends 58 and 59 of the valve body 52 are provided with cap members 60 and 61 which threadingly engage the ends of the valve body and provide apertures 62 and 63 to receive the control rods 64 and 65. Control rod 64 has one end pivotally connected to equalizer 35 at 66 and its other end is provided with a spring seat 67 within the valve body 52. Control rod 65 is likewise provided with a pivotal connection with equalizer 42 at 68 and a spring seat 69 within the valve body 52. Balance springs 70 and 71 are respectively arranged in the valve body 52 between the spring seats 67 and 69 and the pistons 53 and 54.

In operation, when the air has not been applied to the brake cylinders 9 and 10, and the spring seats 67 and 69 of the operating rods 64 and 65 are abutting the capped members 60 and 61, the balance springs 70 and 71 normally bias the pistons 53 and 54 so that both ports 56 and 57 are both open permitting air to be introduced to both brake operating cylinders 9 and 10. When air is introduced through the air line 56, the operating rods 33 and 34 respond by moving to the right and left respectively and if this movement is substantially simultaneous and equal, the balance springs 70 and 71 are equally compressed so that the pistons 53 and 54 remain in substantially mid-position. This leaves the ports 56 and 57 open, permitting air to be continued to be supplied to the brake operating cylinders 9 and 10. However, if the operating rod 33 should not move a distance simultaneously equal to the distance moved by the operating rod 34 but moves ahead of the rod 34, control rod 64 pushes the pistons 53 and 54 by means of the balance spring 70 to the right closing or partially closing the port 56 depending on the degree of unequal motion. This reduces or shuts off the flow of air to the brake operating cylinder 9 permitting the operating rod 34 of brake cylinder 10 to reach a position equal to the position of the operating rod 33. At this point, control rod 65 will push the valve assembly 53 and 54 back again opening port 56 to admit air to both of the brake operating cylinders 9 and 10.

It will now be readily apparent that this invention provides a simple and inexpensive means for insuring that the brakes respectively actuated by two independent brake operating cylinders are applied equally and simultaneously. While a brake rigging is disclosed wherein two cylinders on the same side of a truck are used to independently apply brakes on two wheels on the same side of the truck, it will be readily apparent that it is equally applicable to a brake rigging wherein the two cylinders are used to apply brakes on a third wheel, as in a six wheel truck. It will be further apparent that this improved system may be utilized in any brake rigging wherein two brake cylinders independently apply two sets of brakes.

While I have illustrated and described a particular embodiment of this invention, modifications thereof will occur to those skilled in the art. I desire it to be understood, therefore, that this invention is not to be limited to the particular arrangement disclosed and I intend in the appended claims to cover all modifications which do not depart from the spirit and scope of my invention.

What I claim as new and desire to secure by Letters Patent of the United States is:

1. A brake rigging for a rail vehicle truck comprising two air cylinders for independently applying two sets of wheel brakes of said truck, means for actuating each of said brake sets including an operating rod on each of said cylinders and linkage operatively connecting said operating rod and said brake set, a valve body, a pair of spaced-apart mechanically connected pistons arranged in said valve body, air lines respectively connected to each of said cylinders and normally communicating with the space between said pistons for supplying air to each of said cylinders, means for introducing air to the space between said pistons, resilient means normally biasing said pistons so that both of said air lines are open, means respectively connecting said resilient means and said brake actuating means, said last-mentioned means being respectively operable in response to movement of each of said operating rods and adapted to bias said resilient means for holding said pistons in said normal position when the movement of said operating rods is equal and for moving said pistons to close one of said air lines when said movement is unequal to reduce the flow of air to the cylinder associated with said one air line so that the movement of said operating rods is equalized whereby said brake sets are evenly applied.

2. A brake rigging for a rail vehicle truck comprising two air cylinders for independently applying two sets of wheel brakes of said truck, means for actuating each of said brake sets including an operating rod on each of said cylinders and linkage operatively connecting said operating rod and said brake set, a valve body, a pair of spaced-apart mechanically connected pistons in said body, air lines respectively connected to each of said cylinders and normally communicating with the space between said pistons for supplying air to said cylinders, means for introducing air to the space between said pistons, springs in said body respectively seated against said pistons for normally biasing said pistons so that both of said air lines are open, means respectively connecting said springs and said brake actuating means, said last-mentioned means being respectively operable in response to movement of each of said operating rods and adapted to bias said springs for holding said pistons in said normal position when the movement of said operating rods is equal and for moving said pistons to close one of said air lines when said movement is unequal to reduce the flow of air to the cylinder associated with said one air line so that the movement of said operating rods is equalized whereby said brake sets are evenly applied.

3. In a brake rigging for a rail vehicle truck having two air cylinders for independently applying two sets of wheel brakes of said truck and means for actuating each of said brake sets including an operating rod on each of said cylinders and linkage operatively connecting said operating rod and said brake set, air lines for respectively supplying actuating air to said air cylinders, means for equalizing the application of said brake sets comprising a valve body, a pair of spaced-apart mechanically connected pistons in said body, said valve body being arranged in the air line of each of said cylinders, springs in said valve body respectively seated against said pistons for normally biasing said pistons so that both of said air lines are open, means respectively connecting said springs and said brake actuating means, said last-mentioned means being operable in response to movement of each of said operating rods and adapted to respectively bias said springs for holding said pistons in said normal position when the movement of said operating rods is equal and for moving said pistons to close one of said air lines when said movement is unequal to reduce the flow of air to the cylinder associated with said air line so that the movement of said operating rods is equalized whereby said brake sets are evenly applied.

4. A brake rigging for a rail vehicle truck comprising two air cylinders for independently applying two sets of wheel brakes of said truck, means for actuating each of said brake sets including an operating rod on each of said cylinders, and linkage operatively connecting said operating rod and said brake set, a valve body having a pair of spaced-apart mechanically-connected pistons arranged therein, air lines respectively connecting said cylinders and said valve, said pistons being normally positioned so that said air lines communicate with the space therebetween, means for introducing air to the space between said pistons, compressible means arranged in said valve body and respectively applying pressure on said pistons for normally biasing said pistons so that both of said air lines are open, means respectively connecting said pressure applying means and said brake actuating means and operable responsive to movement of said operating rods whereby equal pressures are respectively exerted on said pistons when said movements are equal so that air is admitted equally to both of said cylinders, said pistons being operable responsive to unequal pressures thereon when said movements are unequal to close one of said air lines for reducing the flow of air to the cylinder associated therewith whereby said movements are equalized so that said brake sets are evenly applied.

WILLIAM R. SCHETTLER.

REFERENCES CITED

The following references are of record in the file of this patent:

UNITED STATES PATENTS

| Number | Name | Date |
|---|---|---|
| 1,969,159 | Simanek | Aug. 7, 1934 |
| 2,484,908 | Purcell | Oct. 18, 1949 |
| 2,517,078 | Billon | Aug. 1, 1950 |

FOREIGN PATENTS

| Number | Country | Date |
|---|---|---|
| 484,313 | Germany | Oct. 15, 1929 |